Aug. 15, 1933.  C. A. FRICK ET AL  1,923,032
BOTTLE REFRIGERATOR
Filed Oct. 26, 1928   3 Sheets-Sheet 1

INVENTORS
Chester A. Frick and
BY  Robert E. Baker,
Hood + Hahn,
ATTORNEYS

Aug. 15, 1933.   C. A. FRICK ET AL   1,923,032
BOTTLE REFRIGERATOR
Filed Oct. 26, 1928   3 Sheets-Sheet 3

INVENTORS
Chester A. Frick and
Robert E. Baker,
BY
Hood + Hahn.
ATTORNEYS

Patented Aug. 15, 1933

1,923,032

UNITED STATES PATENT OFFICE 1,923,032

BOTTLE REFRIGERATOR

Chester A. Frick and Robert E. Baker, Muncie, Ind., assignors to Glascock Brothers Mfg. Co., Muncie, Ind., a Corporation of Indiana Application October 26, 1928. Serial No. 315,132

4 Claims. (Cl. 312—36)

Our invention relates to improvement in bottle dispensing and refrigerating apparatus, particularly that type used for dispensing bottled carbonated beverages.

It is one of the objects of our invention to provide a coin-controlled dispensing refrigerator which will contain a maximum number of bottles, which will provide means for maintaining the bottled beverage in a chilled condition and which may be cheaply made and assembled.

Figure 1:
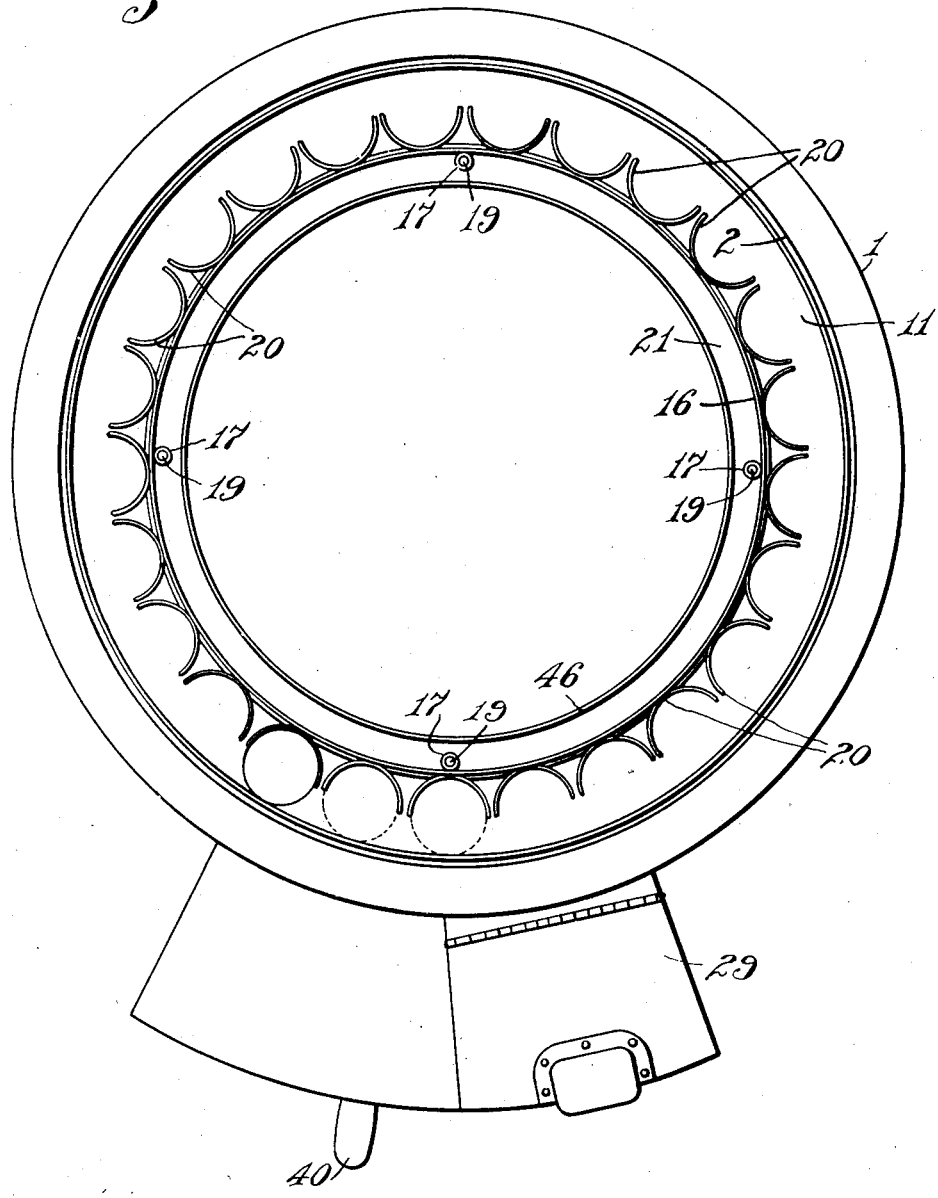
Figure 2:
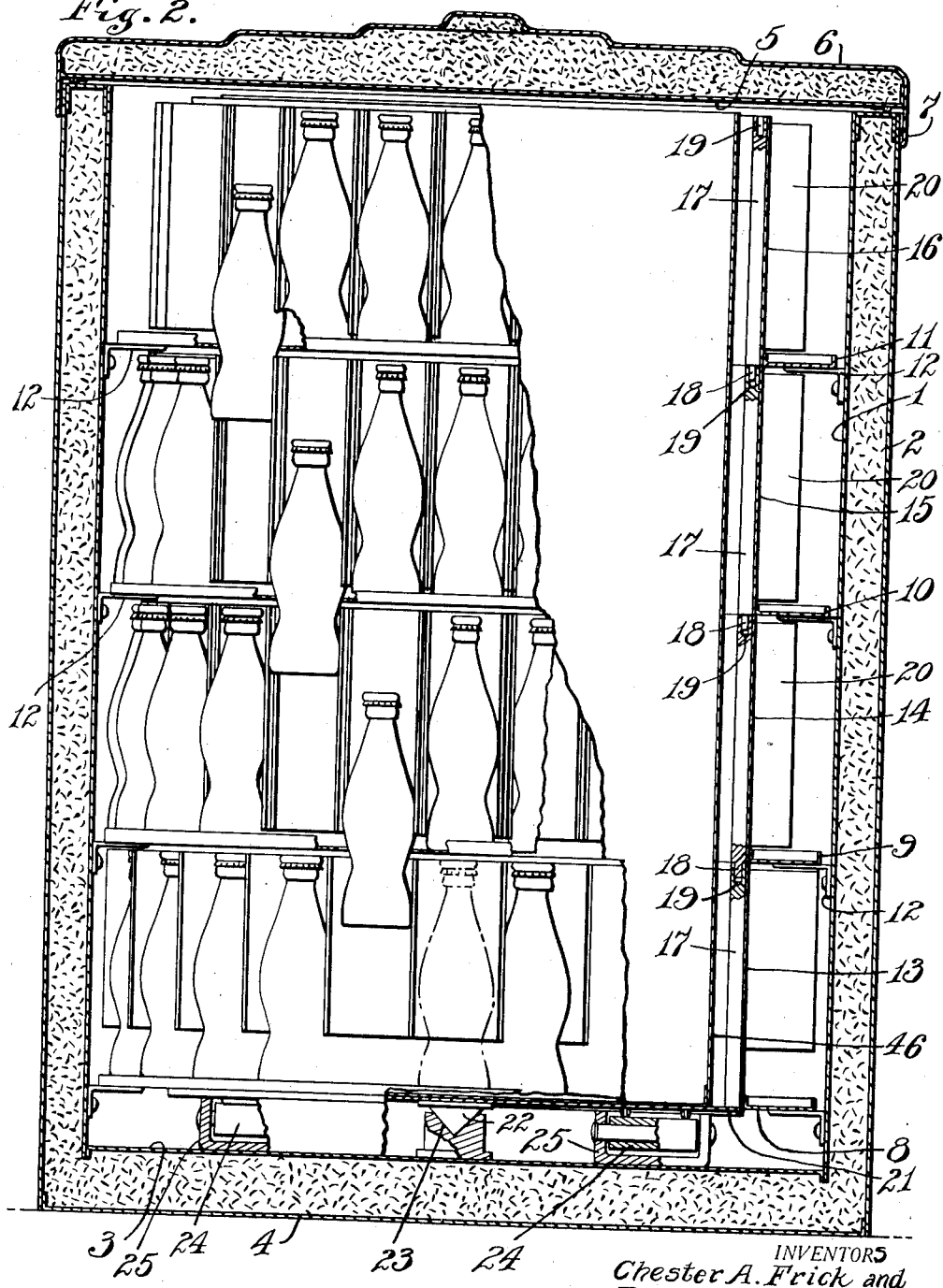
Figure 3:
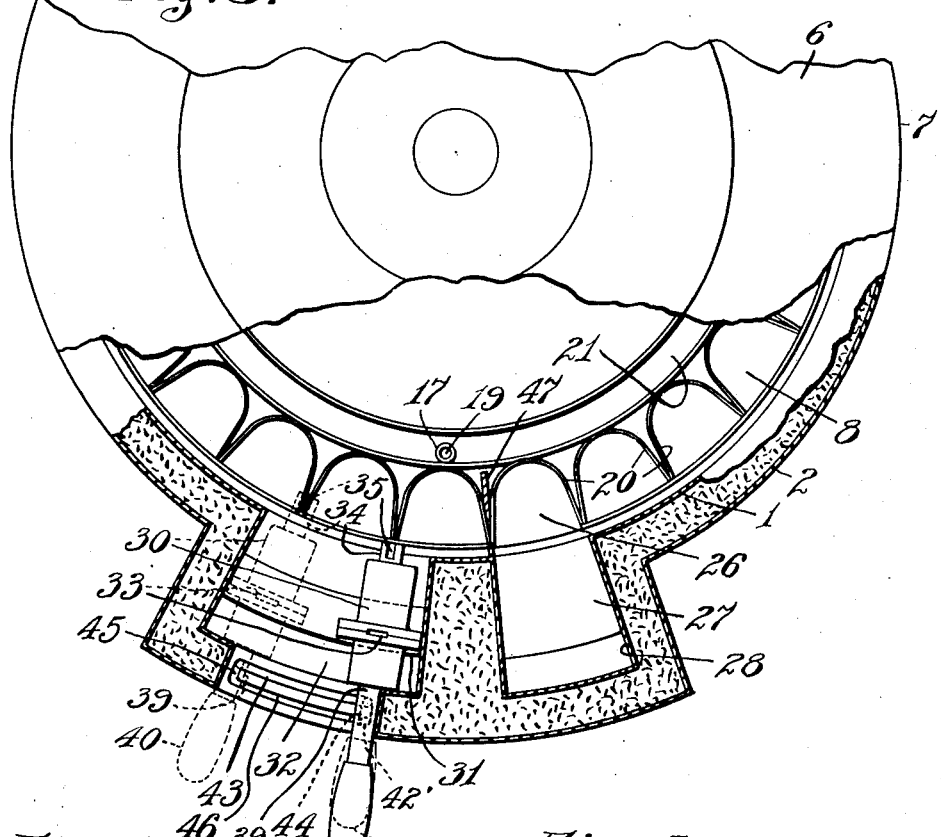
Figure 4:
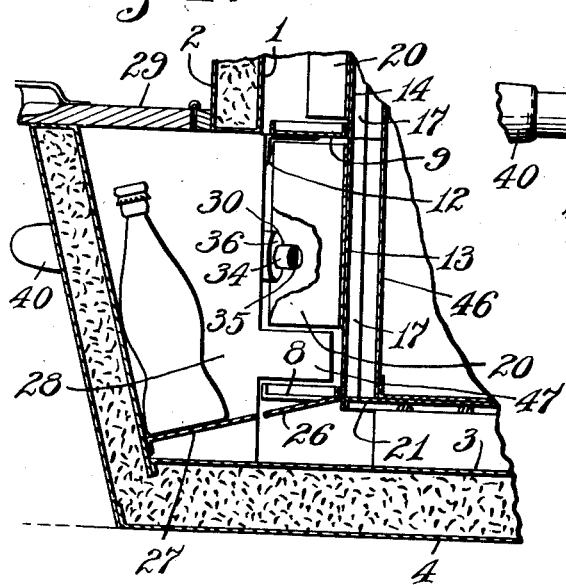
Figure 5:
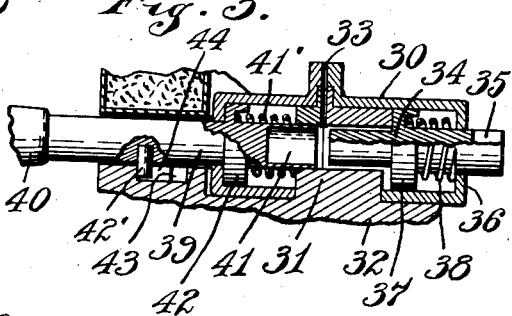

For the purpose of disclosing the invention one embodiment thereof is illustrated in the accompanying drawings in which Fig. 1 is a plan view of a dispensing refrigerator embodying the invention, the top being removed; Fig. 2 is a transverse longitudinal section of the structure illustrated in Fig. 1; Fig. 3 is a plan view of the bottle dispensing ring; Fig. 4 is a detail section showing the bottle delivery mouth and Fig. 5 is a detail section showing the coin-controlled operating lever.

In the embodiment illustrated a preferably cylindrical casing comprising the inner walls 1 and the outer walls 2 between which suitable insulating filler is placed, is provided. The bottom of this casing is likewise provided with an inner wall 3 and a bottom outer wall 4 between which insulating material is provided. A top or cover member is provided for the casing likewise having inner and outer walls 5 and 6 holding a heat insulating material between them and this cover is provided with a lip 7 which overlaps the top of the casing to provide a tight seal at this point.

Within the casing there is provided a series of circular channelled rings 8, 9, 10 and 11, which are arranged one above the other and suitably spaced apart sufficiently to accommodate a beverage bottle between the same. Each of these single rings is supported on brackets 12 which are secured to the inner walls 1 of the casing. These rings surround a propeller drum rotatably mounted within the casing and this drum is preferably formed of a series of cylinders 13, 14, 15 and 16 arranged one above the other, the cylinders being interlocked by means of vertically extending interlocking rods 17 secured within the cylinders and provided with pins 18 adapted to interlock into pockets 19 in the cylinder next beneath the same. Each of these cylinders is provided with propellers which preferably take the form of arcuate fins 20 so shaped as to form vertically extending bottle pockets which extend over the circular channel rings. Each of these pockets at the base thereof is preferably secured to the cylinder by welding or otherwise.

The drum formed of super-imposed cylinders is supported from a circular bottom plate 21 having a central pivot stud 22 taking into a pivot pocket 23 and supported near its periphery on suitable rollers 24 carried in pockets 25 mounted in the base of the casing. A cylindrical ice tank 46 is also supported by the bottom plate 21 and this ice tank is of substantially the same height as the propeller drum.

Each of the super-imposed ring channels is provided with a delivery opening and the delivery opening of each ring is spaced around the ring the distance of one bottle from the delivery opening of the ring immediately beneath the same so that these delivery openings are in stepped relation one above the other. The bottom ring instead of having a delivery opening, at its delivery point, is provided with an inclined platform 26 which is arranged opposite an inclined delivery chute 27 in a delivery pocket 28 in the casing, the arrangement being such that as a bottle is propelled around the bottom channel ring when it reaches the inclined portion 26 it will tilt outwardly and slide off the ring and onto the slideway 27 so as to be delivered to the pocket 28 from which it may be removed through a suitable door 29.

In operation all of the pockets, except one of each ring is adapted to be filled with beverage bottles. The pocket in the bottom ring which at the time of filling is opposite the inclined bottom 26 remains empty while the pocket of each of the superimposed rings opposite the opening in the ring is of course empty. If now the drum is rotated in a clockwise direction each of the empty pockets will be moved beneath an opening in the ring next above the same and at the same time a bottle will be moved over said opening so as to deliver therethrough. In the case of the bottom ring, however, the bottle will be moved to the inclined platform 26 and will drop out into the delivery pocket. When, however, the bottle has been removed from the delivery pocket no more bottles can be removed from the apparatus until the propeller drum has been rotated one step. It is obvious that the bottom ring will be constantly replenished with fresh bottles so long as there are any bottles remaining in the rings above the same and that the top ring will be the first ring to be emptied.

In order that the propeller drum may be operated only upon the deposit of a suitable coin in payment of the bottle to be removed we provide an operating lever of peculiar construction adapted to be operably connected with the propeller drum only when a coin is provided. To this end we provide a slide casing 30 having a bottom slot adapted to fit over a guide track 31 on a suitable base 32. This casing at its top is provided with a coin slot 33. Extending through the casing is an operating lever or plunger formed of two sections. The inner section 34 has its inner end bifurcated as at 35 to engage the edges of the arcuate fins on the bottom section of the propeller drum. Interposed between the end 36 of the casing and an integral collar or shoulder 37 on the section 34 is a coil spring 38 which tends to move this portion of the plunger in its retracted or disengaged position. When in its retracted or disengaged position the inner end of this plunger section is adjacent the coin slot 33. The other section 39 of the plunger extends out from the opposite side of the casing into an operating handle 40 and the inner end of this plunger is hollow as at 41 so that under normal conditions in event this plunger is moved inwardly the inner end of the plunger section 34 will telescope therein and will not be affected by such movement. This section 39 is maintained in its outer retracted position by means of a coil spring 41' interposed between a shoulder 42 on the plunger and the track guideway 31. The plunger section 39 is provided with a pin 42' operating in a slot 43, which slot at one end is provided with a right-angled extension 44. In operation with the parts in the position illustrated in Fig. 3 and Fig. 5 when a coin is dropped into the coin slot 33 it passes down to a position between the two plunger sections 39 and 34, the operator then moves the plunger section 39 inwardly along the slot extension 44 and due to the interposition of the coin between the sections 39 and 34, the two sections will move in unison and the section 34 will be moved inwardly so that its bifurcated edge will engage the edges of the arcuate fins. The lever is now moved in a clockwise direction, the pin 42' operating in the slot 34 and is held by said pin against retraction. When the lever has been moved to the limit of its movement in a clockwise direction, to the position illustrated in dotted lines in Fig. 3, the pin 42' takes into the slot extension 45, which permits the retraction of the handle 40 releasing the coin so that it may drop through a suitable opening beneath the lever, thereby permitting the plunger section 34 to be retracted from engagement with the fins. The lever is then moved back to its normal position ready to rotate the drum one step again upon the insertion of another coin, the pin 42' during this operation traveling in the slot 46. To prevent the backward rotation of the drum a stop fin 47 projects above the bottom ring in a position to be engaged by a bottle in event an attempt is made to rotate the drum backward.

We claim as our invention:

1. A dispensing container having a lateral escape passage, a support in said container on which articles to be dispensed may be positioned, the said support being inclined downwardly at said passage whereby articles thereon are tilted through the passage, a drum mounted in the container to turn about a vertical axis and having in its periphery a multiplicity of circumferentially spaced vertical corrugations, said corrugations being normally closed by the container case, and means for turning said drum to successively bring said corrugations into registration with said passage.

2. In a cooling and dispensing refrigerator, the combination with an outer water tight casing, of an inner water tight refrigerant container having its walls spaced apart from the outer casing to form a water compartment therebetween, a plurality of circular supporting run ways for bottles arranged one above the other in said compartment and supporting the bottles in upright position, each having a single opening therein to permit a bottle to drop therethrough and means for propelling the bottles through said compartments along the run ways to the openings, a bottom run way, a downwardly and outwardly inclined portion on said run way to tilt the bottles outwardly and off said run way, said casing having an offset portion opposite said inclined portion to receive the bottles in a vertical position from the bottom run way and having a delivery opening at its top.

3. The combination with an outer water tight casing, of an inner water tight refrigerant container having its walls spaced apart from the outer casing to form a water compartment therebetween, a plurality of circular supporting run ways arranged one above the other in said compartment and supporting the bottles in upright position, each having a delivery opening therein to permit a bottle to drop therethrough, said openings being arranged in stepped relation, means for propelling the bottles through said compartment along the run ways to the openings, a bottom run way and a downwardly and outwardly inclined portion on said run way to tilt the bottles outwardly and off said run way, said casing having an offset portion opposite the bottom row of bottles provided with a downwardly and outwardly inclined portion opposite said downwardly and outwardly inclined portion on the run way to receive the bottles in a vertical position from the bottom run way and have a delivery opening at its top.

4. The combination with an outer water tight casing of an inner water tight refrigerant container having its walls spaced apart from the outer casing to form a water tight compartment, a plurality of circular supporting run ways for bottles arranged one above the other and each having a single opening therein to permit a bottle to drop therethrough, a plurality of open sided pockets arranged on said inner container adjacent each of said run ways for propelling individual bottles over said run ways to said openings, a bottom run way and a downwardly and outwardly inclined portion in said bottom run way to tilt the bottles outwardly and off the run way, said casing having an offset portion opposite the bottom row of bottles to receive the bottles vertically from the bottom run way and having a delivery opening at the top thereof.

CHESTER A. FRICK.
ROBERT E. BAKER.